May 13, 1930.                    C. H. BOLIN                     1,758,025
                                 POLE PLANER
                          Filed Dec. 28, 1927         2 Sheets-Sheet 1

INVENTOR.
C. H. Bolin
BY
ATTORNEY

INVENTOR.
C. H. Bolin
BY
ATTORNEY

Patented May 13, 1930

1,758,025

UNITED STATES PATENT OFFICE

CARLETON H. BOLIN, OF SEATTLE, WASHINGTON, ASSIGNOR TO AMERICAN TELEPHONE AND TELEGRAPH COMPANY, A CORPORATION OF NEW YORK

POLE PLANER

Application filed December 28, 1927. Serial No. 243,142.

This invention relates to planers, and more particularly to planers which are adapted for shaving poles and other similar work.

An object of the invention consists in a portable planer having a cutting head provided with knives which rotate at right angles to the pole, or other object operated upon, to effect the desired shaving, peeling or trimming thereof as the planer is caused to travel along the surface of such object.

Another object consists in directly connecting the driving motors on the planer to each end of the cutting knife holder to relieve said holder of excessive stresses and improve the balance of the planer.

A further object consists in the provision of a portable planer of the above character which will be simple, durable and efficient and which may be manufactured and operated at a comparatively low cost.

These and further objects will be apparent from the following description, when considered in connection with the accompanying drawings, in which one embodiment of the invention is illustrated.

Figure 1:
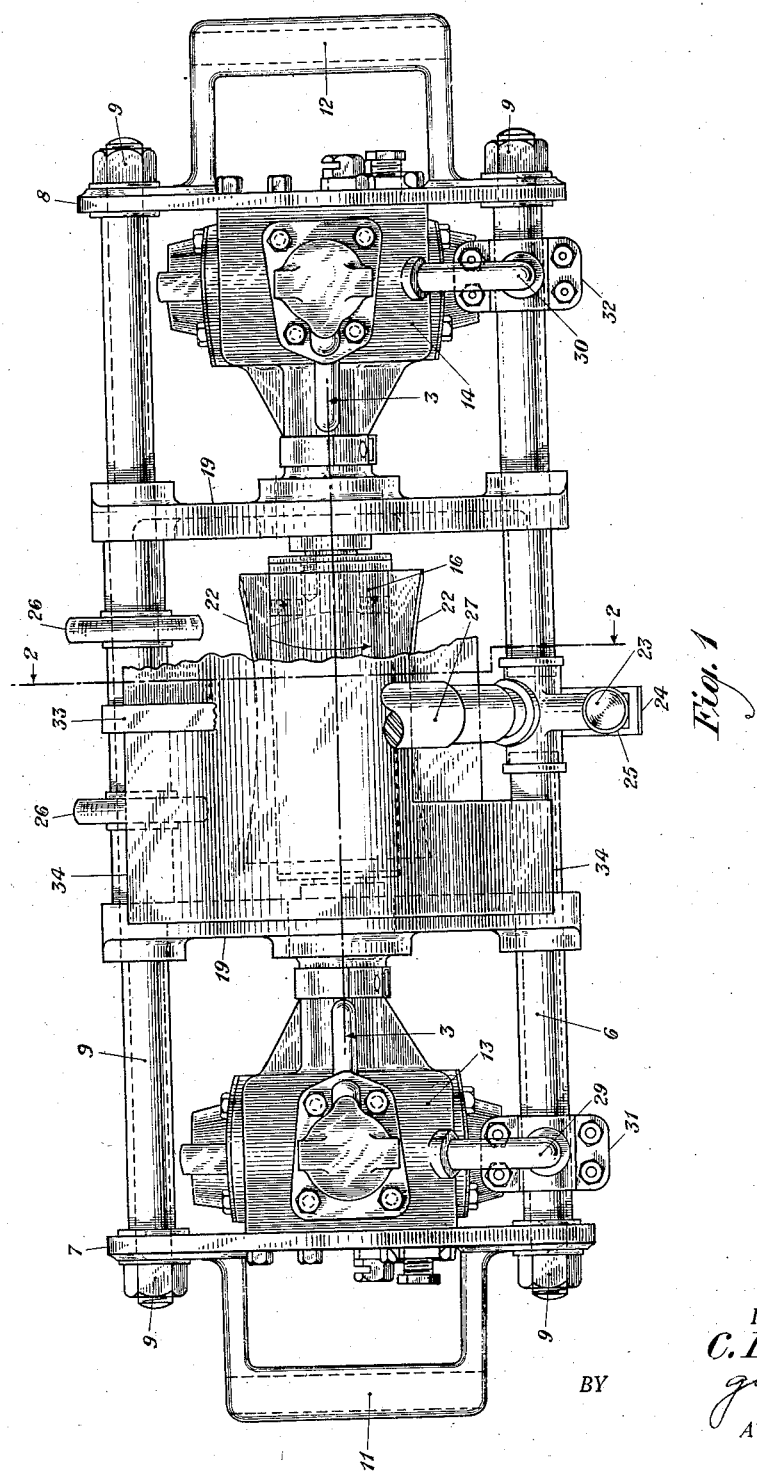
Figure 2:
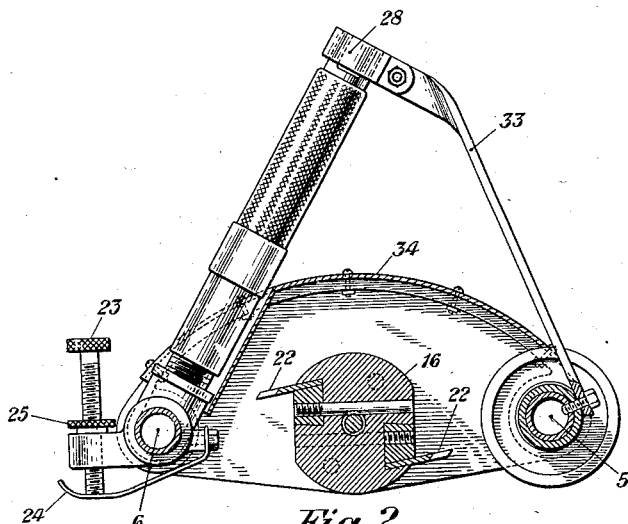
Figure 3:
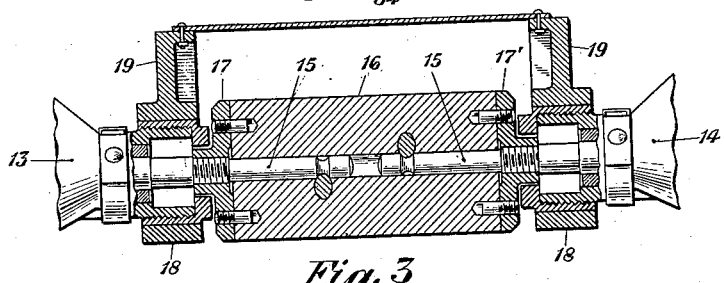
Figure 4:
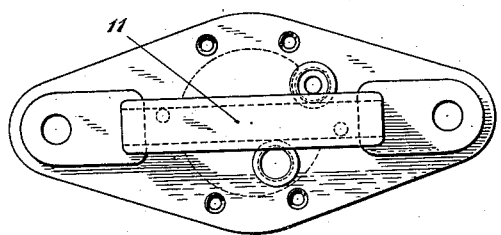
Figure 5:
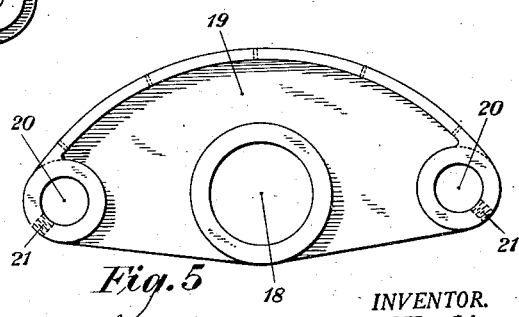

Referring to the drawings, Figure 1 is a top plan view of the improved planer; Fig. 2 is a section taken on the line 2—2 of Fig. 1 showing detail parts including a holder with its positioned knives and a throttle handle for the planer; Fig. 3 is a section of the knife holder taken on the line 3—3 of Fig. 1; Fig. 4 is a side elevation of a handle which is positioned at each end of the planer, and Fig. 5 is a side elevation of one of a pair of castings which forms an end support for the motors.

The improved planer is shown in the drawings as comprising a framework consisting of two parallel longitudinal side members 5 and 6, and two parallel end members 7 and 8. The parallel side members 5 and 6 may be made from seamless steel tubing, and their threaded ends may extend through openings provided in the members 7 and 8, to which they are suitably secured by bolts 9. The threaded ends of the side members 5 and 6 also pass through openings in the handles 11 and 12, which are positioned on each side of the framework, and the bolts 9 serve to clamp said handles thereto.

A pair of motors 13 and 14 are mounted on the framework, and are shown in the present instance, for the purpose of illustration as being of the compressed air type. It will be understood, however, that electric motors are equally well adapted for the purpose of operating the planer. The motors 13 and 14 are of the same type and are positioned similarly toward each end of the framework and are bolted to their respective end members 7 and 8. The crank shaft or inner ends of these motors are supported in two castings 19, 19 as shown in Fig. 3. The castings are substantially flat and somewhat oval in shape and have an arcuate or arched top surface. Each casting has an opening 20 provided at the front and rear ends thereof. When the castings are in position these openings are in horizontal alinement with each other so that the rear side member 6 passes through the rear openings in the parallel castings, and the front member 5 passes through the front openings in said castings to provide a suitable support therefor. Studs 21 may extend through the ends of the castings to engage the members 5 and 6 to prevent longitudinal movement of the castings on said members. These motors lie in an approximately central position with respect to the side members 5 and 6 and are equipped with alined shafts 15, as more clearly indicated in Fig. 3. The direction of rotation of their shafts is opposite when viewed from the same end. When viewed from the end the crank shaft of the motor 13 is designed for left-hand rotation, and the crank shaft of motor 14 is designed for right-hand rotation. The crank shafts extend from their respective motors toward each other into the center of a cutter-head or blade-holder 16 through its opposite ends. The holder 16 has two end plate members 17 and 17' attached to either of its ends by means of studs or the like. These plate members are affixed to the crank shafts and serve to secure the cutter block to the crank shafts of the motors. Plate 17 is provided with a right-hand thread for engaging the right-hand thread on the crank shaft of the motor 13, and plate 17' is provided with a left-hand thread for engaging the left-hand thread on the crank shaft of motor 14. There is a tendency, therefor, for the end plates 17 and 17' to tighten on the crank shafts of their respective motors when the motors are in operation.

The cutter block 16 is substantially cylindrical in form and has two plane sides in each of which a longitudinal slot is provided. A cutting blade 22 is positioned in each of the slots, and are located at a distance of approximately 180° from each other. The separation of the blades permit them to be somewhat cooled between their engagement with the object being planed. The blades 22 are secured to the block by inverted wedges and these in turn are secured in position by means of screws which extend through the cutter block, as more clearly indicated in Fig. 2. The edges of the cutting blades 22, are slightly concaved to conform approximately to the contour of the object the planer is to operate upon, such as a pole. These blades may be readily removed to be sharpened, or replaced by new blades. The depth of cut of these blades may be altered by an adjusting screw 23 which is carried by a bracket formed integral with a handle to be presently described. The adjusting screw 23 controls the position of a spring member 24, and the screw 23 may be set in a desired position by means of a lock nut 25. One end of the spring member 24 may be bolted to the frame member 6 and the other end extends under the adjusting screw 23. Thus the cutter block 16 is maintained at a desired elevated or lowered position by means of the regulated spring member 24 so that the knives 22 carried by said cutter block engage the pole or other object operated on to plane it at a desired depth. The spring member 24 also acts as a rear sliding support for the planer.

The front side member 5 is provided with two roller wheels 26, 26, which are rotatably mounted thereon. These wheels serve to guide and facilitate the movement of the planer along the surface of a pole. The position of the wheels is fixed on the tubular front side member 5 by means of pipe spacers which are placed over this member on either side of the wheels and serve to prevent their longitudinal movement. These pipe spacers with the intermediately positioned wheels lie on the front side member 5 between the castings 19, 19, which prevent any substantial lateral movement of these elements.

The planer is provided with a control handle 27, as more clearly shown in Fig. 2. This handle also comprises the throttle for controlling the compressed air input into the motors 13 and 14. The throttle may be of the motorcycle type, and accordingly may operate so that the air is supplied or disconnected from the motors by rotatably turning the handle to the right or left. This type of throttle may be also employed if electric motors are used for operating the planer. The lower portion of the handle may be coupled to the tubular side member 6 by means of a T-joint connection, and an inlet 28 is provided at the top of the handle. A hose (not shown) supplying compressed air is connected to this inlet in a well-known manner. The air flows down through the hollow handle or throttle into the rear tubular side member 6 where it divides and enters the motors 13 and 14 through elbow connections 29 and 30, respectively, which are suitably connected to the tubular member 6. The elbow connections 29 and 30 are each suitably connected to the tubular rear member 6 and also to their respective motors. To secure the connections in place, plates 31 and 32 are provided. These plates are shown in Fig. 1 as being positioned above the tubular frame member 6. Each of the plate members have a central semi-circular portion, and lying beneath each plate is a companion plate member of similar form. The companion plate members form a collar about the tubular frame member 6 and when bolted together form a clamp about the latter member to securely position the respective elbow connections 29 and 30 thereon. A brace 33 is provided for the handle 27 and extends from the top of said handle to which it is affixed to the front frame member 5 to which it is secured by some such means as a set screw. The brace 33 is provided for the purpose of giving rigidity to the handle member 27.

The upper arched surfaces of the castings 19, 19, previously referred to have a curved sheet of metal secured to them in the form of a guard 34. This guard prevents chips which are separated from the pole during the process of its being planed, from flying into the operator's face.

In the operation of the improved planer, it is positioned on the pole or other object to be operated on. The operator starts the motors by means of the controller throttle and pushes the planer along the pole by means of the side handles. The required depth of cut to be made by the knives of the cutter block is regulated as desired, and the cutter block which is mounted on the framework rotates about an axis parallel to the surface to be planed, removes the bark or planes the object in an obvious manner.

What is claimed is:

1. A planer having framework comprising a pair of longitudinal side members and a pair of cross members associated with the ends thereof, a pair of auxiliary cross members positioned between the end cross members and carried by the side members, means carried by the framework to bear upon an object to be planed, a motor mounted on each cross member and auxiliary cross member, a rotatable cutter positioned between said motors and rotated thereby about an axis parallel to the object to be planed, a controller handle associated with the side members provided with means for starting and stopping said motors, and a handle on each cross member at the ends of the planer whereby the operator may move the planer bodily along the surface to be worked upon.

2. A portable planer having framework comprising a pair of longitudinal side members and a cross member for connecting each end thereof, auxiliary cross members carried by the side members and positioned intermediate the end cross members, means carried by the side members to slidingly bear upon an object to be planed, a rotatable cutter member centrally positioned in said framework to rotate about an axis parallel to the surface of the object to be planed, a motor carried by the cross members and auxiliary cross members and connected to the ends of said cutter member to cause its rotation, a controller handle associated with the framework provided with means for starting and stopping said motors, a handle associated with each end cross member whereby the operator may move the planer bodily along the surface to be worked upon, and a guide member associated with one of said side members for facilitating the movement of said planer.

3. A portable planer for poles having framework of substantially rectangular form comprising a pair of longitudinal side members and a cross member for connecting the ends of the side members to each other, auxiliary cross members carried by the side members and positioned intermediate the end cross members, means carried by the framework to slidingly bear upon an object to be planed, a rotatable cylindrical cutter member centrally positioned in said framework to rotate about an axis parallel to the surface of the object to be planed, motors mounted on the end cross members and auxiliary cross members having alined shafts connected to the ends of said cutter member to cause its rotation, the cutter member having blades curved to the shape of the pole and positioned in opposite relation on the cutter member, a controller handle associated with the framework provided with means for starting and stopping said motors, a handle associated with each end cross member whereby the operator by grasping each handle may move the planer bodily along the surface to be worked upon, and means comprising rollers associated with one of the longitudinal side members for guiding said planer.

In testimony whereof, I have signed my name to this specification this 28th day of November, 1927.

CARLETON H. BOLIN.